(12) United States Patent
Kono (10) Patent No.: US 9,333,715 B2
(45) Date of Patent: May 10, 2016

(54) CAP UNIT FOR PUNCTURE REPAIR

(71) Applicant: Sumitomo Rubber Industries, Ltd., Kobe-shi, Hyogo (JP)

(72) Inventor: Tsutomu Kono, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 138 days.

(21) Appl. No.: 14/343,683

(22) PCT Filed: Sep. 24, 2012

(86) PCT No.: PCT/JP2012/074362
§ 371 (c)(1),
(2) Date: Mar. 7, 2014

(87) PCT Pub. No.: WO2013/047420
PCT Pub. Date: Apr. 4, 2013

(65) Prior Publication Data
US 2014/0224380 A1    Aug. 14, 2014

(30) Foreign Application Priority Data

Sep. 30, 2011  (JP) .................................. 2011-217785

(51) Int. Cl.
  *B29C 73/02*  (2006.01)
  *B29C 73/16*  (2006.01)
  *B29L 30/00*  (2006.01)

(52) U.S. Cl.
  CPC ........... *B29C 73/166* (2013.01); *B29L 2030/00* (2013.01)

(58) Field of Classification Search
  CPC ............................ B29C 73/166; B29C 73/24
  USPC ........................................ 141/38; 152/415
  See application file for complete search history.

(56) References Cited

U.S. PATENT DOCUMENTS 6,789,581 B2 * 9/2004 Cowan ................. B29C 73/166
                                                                         141/100
7,389,800 B2 * 6/2008 Hickman .............. B29C 73/166
                                                                         141/26

(Continued)

FOREIGN PATENT DOCUMENTS

EP    1 566 424 A1    8/2005
EP    2 186 628 A1    5/2010

(Continued)

OTHER PUBLICATIONS

Extended European Search Report, dated Mar. 13, 2015, for European Application No. 12836236.5.

(Continued)

*Primary Examiner* — Nicolas A Arnett
(74) *Attorney, Agent, or Firm* — Birch, Stewart, Kolasch & Birch, LLP (57) ABSTRACT

Cap unit provided with: cap body (7) having first-flow-channel (5) for feeding compressed air from compressor (3) into bottle container (4) and second-flow-channel (6) for sequentially providing puncture repair liquid (T) and compressed air from the bottle container; and first and second closing plugs (8A, 8B) independent from one another and closing both flow channels. Cap body (7) includes boss portion (11) on which is disposed first-closing-plug securing portion (11A) permitting elastic fitting of first-closing-plug disposed. Upper opening portion (5a) of first-flow-channel opens further inward than the first-closing-plug securing portion, and the upper opening portion of second-flow-channel opens further outward than the first-closing-plug securing portion. Second-closing-plug can be moved by hand and opens second-flow-channel by means of said movement. This reduces precision requirements when fitting a cap unit while ensuring the opening and closing of a first and second path.

3 Claims, 6 Drawing Sheets

(56) References Cited

U.S. PATENT DOCUMENTS

| | | | | |
|---|---|---|---|---|
| 7,798,183 B2* | 9/2010 | Cegelski | ............... | B29C 73/166 141/38 |
| 8,016,022 B2* | 9/2011 | Richason | .............. | F28D 20/028 165/10 |
| 8,146,622 B2* | 4/2012 | Guan | .................... | B29C 73/166 141/114 |
| 8,413,692 B1* | 4/2013 | Hickman | .............. | B29C 73/166 141/38 |
| 8,640,744 B2* | 2/2014 | Dowel | ................. | B29C 73/166 141/330 |
| 2004/0159365 A1* | 8/2004 | Cowan | ................. | B29C 73/166 141/38 |
| 2006/0217662 A1* | 9/2006 | Hickman | .............. | B29C 73/166 604/153 |
| 2008/0098855 A1* | 5/2008 | Cegelski | ............... | B29C 73/166 81/15.6 |
| 2008/0230142 A1 | 9/2008 | Hickman | | |
| 2009/0050232 A1* | 2/2009 | Guan | ................... | B29C 73/166 141/38 |
| 2009/0056850 A1 | 3/2009 | Yanagi et al. | | |
| 2013/0199666 A1* | 8/2013 | Nakao | ................... | B29C 73/166 141/38 |
| 2013/0284313 A1* | 10/2013 | Kojima | ................. | B29C 73/166 141/38 |
| 2014/0190590 A1* | 7/2014 | Taniguchi | ............. | B29C 73/166 141/38 |
| 2014/0209208 A1* | 7/2014 | Taniguchi | ............. | B29C 73/166 141/38 |
| 2014/0224380 A1* | 8/2014 | Kono | .................... | B29C 73/166 141/37 |
| 2015/0246490 A1* | 9/2015 | Kono | ................. | F04B 11/0008 417/444 |

FOREIGN PATENT DOCUMENTS

| | | |
|---|---|---|
| JP | 2007-168418 A | 7/2007 |
| JP | 2009-23123 A | 2/2009 |
| JP | 2009-23225 A | 2/2009 |
| JP | 2009-29036 A | 2/2009 |
| JP | 2011-131546 A | 7/2011 |

OTHER PUBLICATIONS

International Search Report issued in PCT/JP2012/074362 mailed Nov. 13, 2012.

* cited by examiner

CAP UNIT FOR PUNCTURE REPAIR

TECHNICAL FIELD

The present invention relates to a cap unit for puncture repair secured to a mouth portion of a bottle container storing a puncture repair liquid. With compressed air from a compressor, the cap unit for puncture repair is to sequentially charge the puncture repair liquid and the compressed air into a punctured tire to temporarily repair the puncture.

BACKGROUND ART

Figure 6:
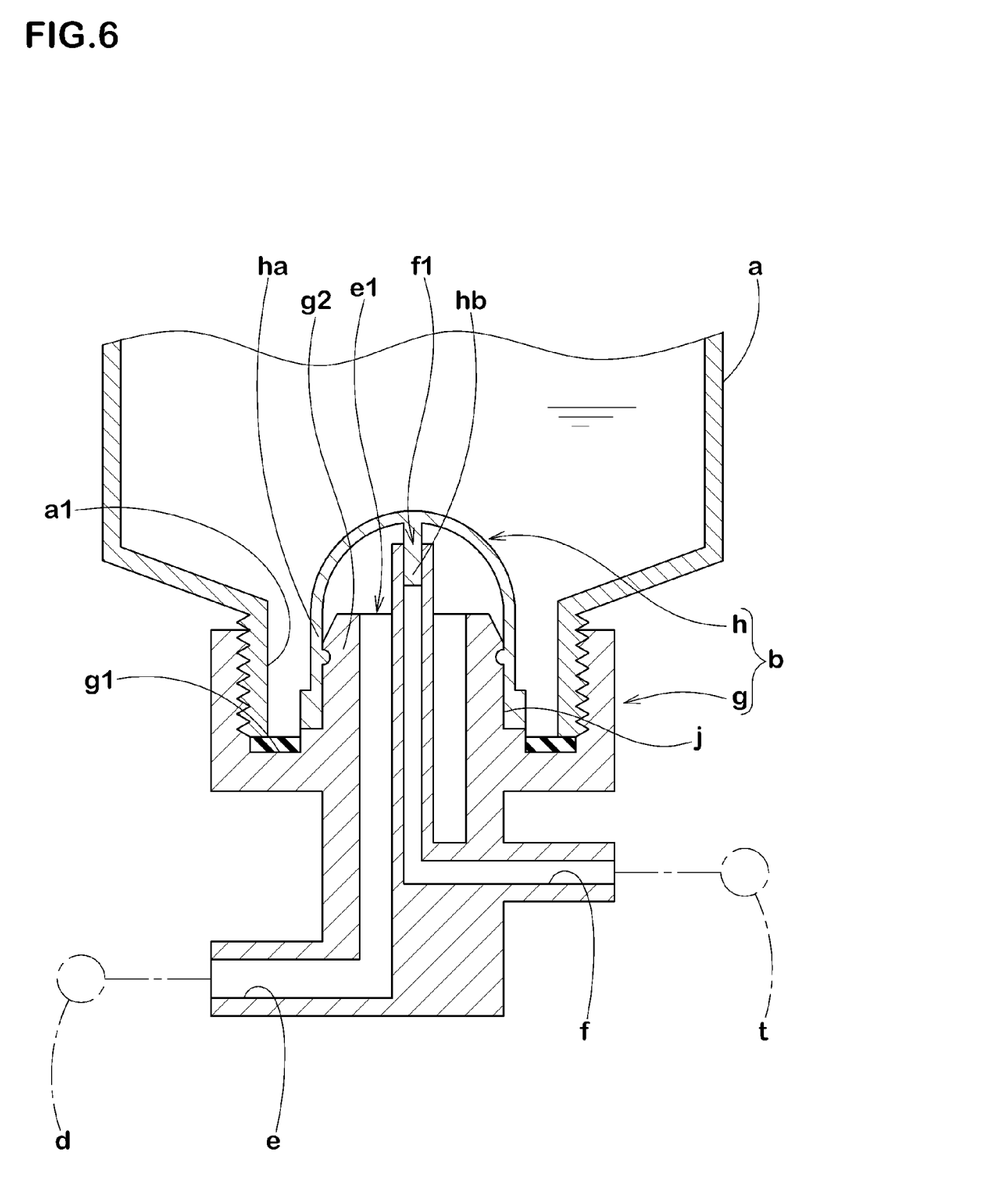
FIG. 6 is a cross-sectional view illustrating a convention cap unit.

For example, the following patent document 1 describes a cap unit (b) for puncture repair. The cap unit (b) is secured to a mouth portion (a1) of a bottle container (a) as shown in FIG. 6. With compressed air from a compressor (d), a puncture repair liquid and the compressed air are sequentially charged into a punctured ti re (t) to temporarily repair the puncture.

The cap unit (b) includes a cap body (g) including first and second flow channels (e) and (f), and a lid-shaped closing plug (h) to simultaneously close the first and second flow channels (e) and (f). The first flow channel (e) is the flow channel to feed the compressed air from the compressor (d) into the bottle container (a). The second flow channel (f) is the flow channel to sequentially take out the puncture repair liquid and the compressed air from the bottle container (a) by a feed of the compressed air.

Specifically, the cap body (g) includes a securing recess portion (g1) to screw thereto the mouth portion (a1) of the bottle container (a), and a boss portion (g2) extending upward from a bottom surface of the securing recess portion (g1). An outer peripheral surface of the boss portion (g2) defines a closing plug securing portion (j) to allow the closing plug (h) to be elastically fitted thereto. The boss portion (g2) includes upper opening portions (e1) and (fi) respectively for the first and second flow channels (e) and (f), which are disposed further inside than the closing plug securing portion (j). The closing plug (h) integrally includes a closing plug body (ha) and a plug shank portion (hb). The closing plug body (ha) is to be fitted to the outer peripheral surface of the boss portion (g2) (the closing plug securing portion (j)) so as to close the first flow channel (e). The plug shank portion (hb) is to be fitted into the upper opening portion (f1) so as to close the second flow channel (f).

The cap unit (b) is subjected to on-vehicle storage in a mount state in which the cap unit (b) mounts thereon the bottle container (a). At the time of a puncture repair, the cap unit (b) in the mount state is to be piped to operate the compressor (d). This allows the compressed air to flow through the first flow channel (e) into the closing plug body (ha). Then, upon an increase in internal pressure of the closing plug body (ha), the closing plug (h) is to automatically disengage. That is, the first and second flow channels (e) and (f) are to be opened.

Accordingly, the closing plug (h) does not need to disengage during the storage, and needs to easily disengage with the compressed air at the time of the puncture repair. Therefore, enhanced precision in fitting dimension between the closing plug (h) and the cap body (g), and high precision control of an interlocking force between the closing plug (h) and the cap body (g) are respectively required.

However, with the conventional structure, interlocking variations occur in both the closing plug body (ha) and the plug shank portion (hb). Hence, further enhanced precision is needed for the fitting dimension, thus leading to a drop in yield rate and an increase in process costs for a product inspection process.

Additionally, the conventional structure needs simultaneous disengagement in the fitting of the closing plug body (ha) and the fitting of the plug shank portion (hb). When the plug shank portion (hb) is first about to disengage to cause a gap, the compressed air in the closing plug body (ha) leaks from the gap to the second flow channel (f). Consequently, the internal pressure of the closing plug body (ha) stops increasing, and the closing plug (h) does not disengage from the boss portion (g2). On the other hand, when the closing plug body (ha) is first about to disengage to cause a gap, the compressed air leaks from the gap into the bottle container (a). Consequently, the pressure in the bottle container (a) increases to decrease a pressure difference between the inside and outside of the closing plug body (ha). Consequently, also in this case, the closing plug (h) does not disengage from the boss portion (g2). Thus, the closing plug body (ha) and the plug shank portion (hb) need to disengage simultaneously, and this also contributes to the need for high precision.

RELATED ART DOCUMENT

Patent Document

Patent document 1: Japanese Unexamined Patent Application Publication No. 2009-23123.

DISCLOSURE OF THE INVENTION

Problems to be Solved by the Invention

Accordingly, it is an object of the present invention to provide a cap unit for puncture repair capable of relaxing the fitting precision of the cap unit while ensuring opening/closing of first and second flow channels, thereby capable of suppressing, for example, a drop in the yield rate of the cap unit and an increase in the process costs for the product inspection process.

Means of Solving the Problems

To solve the above problems, in claim 1 of the present application, a cap unit comprises: a cap body attached to a mouth portion of a bottle container storing a puncture repair liquid, and comprising an inlet mouth portion configured to feed compressed air from a compressor into the bottle container through a first flow channel, and an outlet mouth portion configured to sequentially take out the puncture repair liquid and the compressed air from the bottle container through a second flow channel by a feed of the compressed air; and closing means for closing the first flow channel and the second flow channel. The closing means comprises a first closing plug configured to close the first flow channel, and a second closing plug defined independently of the first closing plug and configured to close the second flow channel. The cap body comprises a mouth portion securing recess configured to allow the mouth portion of the bottle container to be inserted into and secured to the mouth portion securing recess, and a boss portion extending upward from a bottom surface of the mouth portion securing recess, and comprising a first closing plug securing portion permitting elastic fitting of the first closing plug to the first closing plug securing portion. An upper opening portion of the first flow channel opens further inward than the first closing plug securing portion of the boss portion, and an upper opening portion of the second flow channel opens further outward than the first closing plug securing portion. The first closing plug is configured to disengage from the first closing plug securing portion to open the first flow channel upon an increase in pressure of the first flow channel with the compressed air from the compressor, and the second closing plug is subjected to a manual movement so as to open the second flow channel by the movement.

In claim 2, the second flow channel comprises a second vertical flow channel portion extending downward from the upper opening portion, and a second lateral flow channel portion communicating via an intersection portion P2 with the second vertical flow channel portion, the second lateral flow channel portion extending from the intersection portion P2 to a tip opening portion of the outlet mouth portion. And, the second closing plug is configured to be interposed in the second lateral flow channel portion so as to close the second lateral flow channel portion, and the second closing plug is configured to be manually moved along the second lateral flow channel portion so as to open the second lateral flow channel portion.

In claim 3, a hose coupling cylinder is disposed on the outlet mouth portion, an inner end side of the hose coupling cylinder being slidably inserted into the second lateral flow channel portion, the hose coupling cylinder comprising a hose coupling portion defined on an outer end side of the hose coupling cylinder. And, upon a push force applied when inserting the hose into the hose coupling portion, the second closing plug is configured to move inward together with the hose coupling cylinder so as to open the second lateral flow channel portion.

In claim 4, the upper opening portion of the first flow channel is located higher than a liquid surface of the puncture repair liquid stored in the bottle container in a mount state in which the bottle container is mounted on the cap unit.

In claim 5, the upper opening portion of the second flow channel communicates with the bottom surface of the mouth portion securing recess.

Effects of the Invention

With the present invention as described above, the upper opening portion of the first flow channel opens further inward than the first closing plug securing portion disposed on the boss portion. The first closing plug is to be fitted to the first closing plug securing portion so as to close the first flow channel. The upper opening portion of the second flow channel opens further outward than the first closing plug securing portion. The second flow channel is to be closed by the second closing plug that is independent of and different from the first closing plug.

It is therefore ensured that only the first closing plug disengages by an increase in pressure of the first flow channel due to the compressed air. In other words, this eliminates the possibility of receiving the influence of the fitting by the second closing plug. This also eliminates the need to disengage simultaneously with the second closing plug. It is therefore ensured to relax the fitting precision of the first closing plug. The second closing plug is to be manually moved to open the second flow channel. Hence, the second closing plug also requires no high fitting precision.

Consequently, it is ensured to prevent the trouble that the closing plug disengages to cause liquid leakage during storage, and the trouble that the closing plug does not disengage at the time of use to make a puncture repair operation inoperable, while suppressing the drop in yield rate during production of the cap unit, and the increase in process costs for the product inspection process.

MODE FOR CARRYING OUT THE INVENTION

An embodiment of the present invention is described in detail below.

Figure 1:
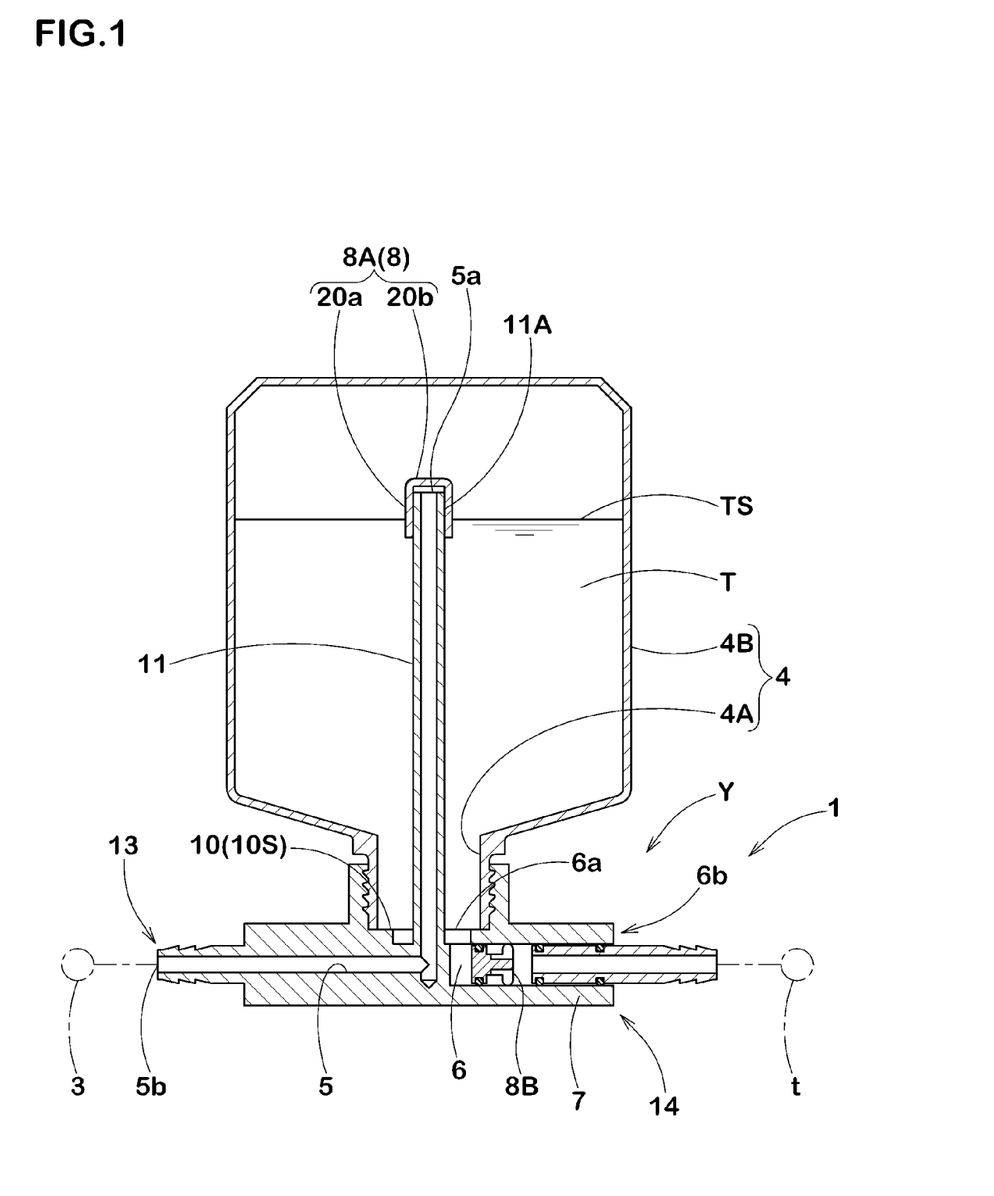
FIG. 1 is a cross-sectional view illustrating an embodiment of a cap unit according to the present invention.

FIG. 1 is a cross-sectional view illustrating a mount state Y in which a bottle container 4 is mounted on a cap unit 1 of the present invention. The cap unit 1 includes a cap body 7 and closing means 8. The cap body 7 includes an inlet mouth portion 13 to feed compressed air from a compressor 3 into the bottle container 4, and an outlet mouth portion 14 to sequentially take out a puncture repair liquid T and the compressed air from the bottle container 4 by a feed of the compressed air. The inlet mouth portion 13 communicates via the first flow channel 5 with the interior of the bottle container 4. The outlet mouth portion 14 communicates via the second flow channel 6 with the interior of the bottle container 4.

The closing means 8 includes a first closing plug 8A to close the first flow channel 5, and a second closing plug 8B to close the second flow channel 6. The first closing plug 8A and the second closing plug 8B are defined independently of each other.

The bottle container 4 constitutes a well-known structure including a container portion 4B to store the puncture repair liquid T, and a small-diameter cylindrical-shaped mouth portion 4A protruding from a lower end of the container portion 4B so as to take out the puncture repair liquid T.

Figure 2:
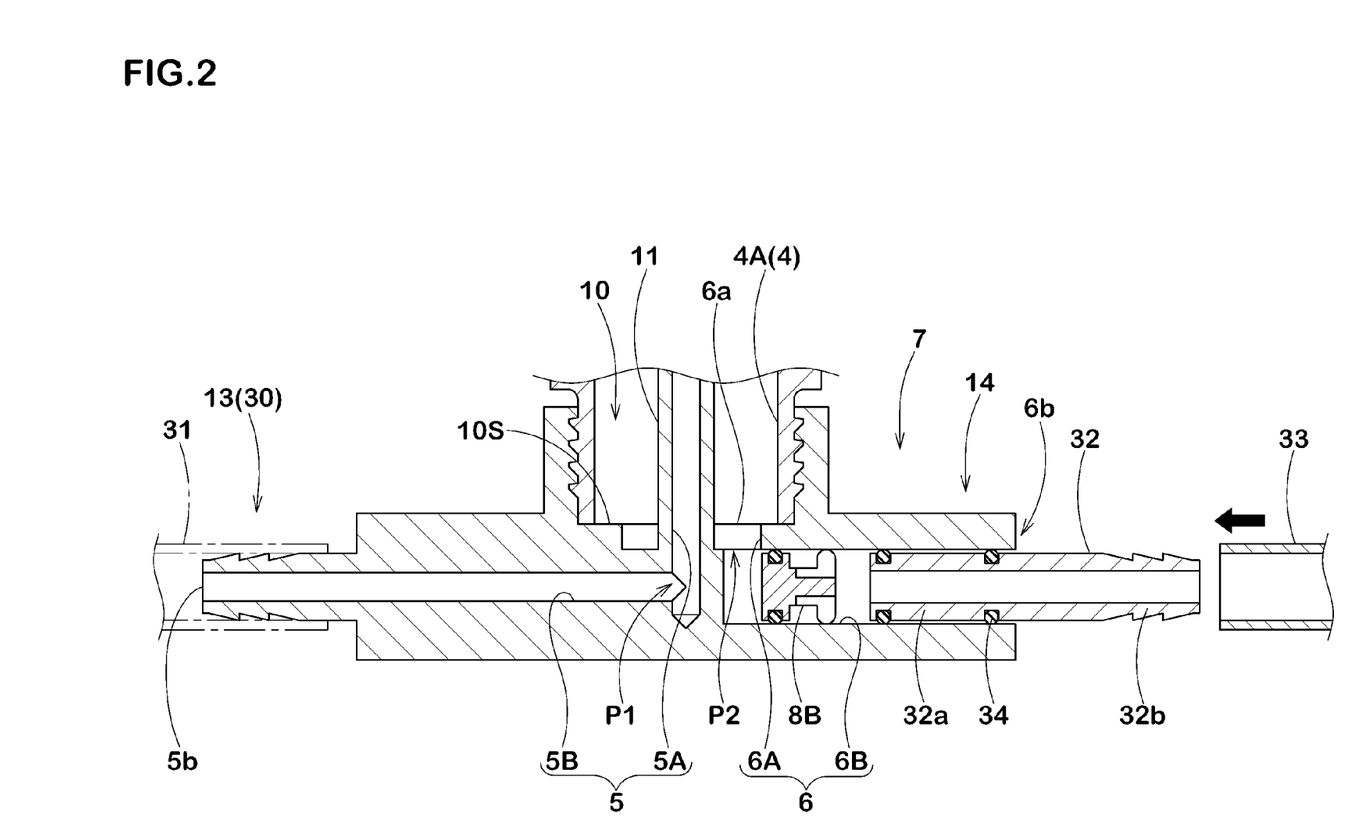
FIG. 2 is an enlarged cross-sectional view of the cap unit.

As shown in enlarged dimension in FIG. 2, the cap body 7 includes, on an upper end portion thereof, a mouth portion securing recess 10 to secure the mouth portion 4A of the bottle container 4, and a boss portion 11 extending upward from a bottom surface 10S of the mouth portion securing recess 10. The mouth portion securing recess 10 includes, on an inner wall surface thereof, an inner screw portion by which the mouth portion 4A is to be screwed into the mouth portion securing recess 10.

In the present embodiment, the boss portion 11 extends upward coaxially with the mouth portion securing recess 10. The upper end of the boss portion 11 is terminated at a height position above a liquid surface TS (shown in FIG. 1) of the puncture repair liquid T stored in the bottle container 4 in the mount state Y.

The inlet mouth portion 13 for coupling the compressor and the outlet mouth portion 14 for coupling a tire are disposed on a side portion of the cap body 7. The inlet mouth portion 13 of the present embodiment is defined as a hose coupling portion 30, and a hose 31 extending from the compressor 3 is to be coupled with the hose coupling portion 30.

A hose coupling cylinder 32 described later is disposed at the outlet mouth portion 14, and a hose 33 extending from the tire (t) is to be coupled with the hose coupling cylinder 32.

The cap body 7 includes therein the first and second flow channels 5 and 6. The first flow channel 5 of these includes a first vertical flow channel portion 5A and a first lateral flow channel portion 5B. The first vertical flow channel portion 5A extends from the upper opening portion 5a (shown in FIG. 1) that communicates with the upper end of the boss portion 11, and extends downward through the boss portion 11. The first lateral flow channel portion 5B communicates via an intersection portion P1 with the first vertical flow channel portion 5A. The first lateral flow channel portion 5B extends from the intersection portion P1 to a tip opening portion 5b at the tip of the inlet mouth portion 13.

The second flow channel 6 includes a second vertical flow channel portion 6A and a second lateral flow channel portion 6B. The second vertical flow channel portion 6A defines a circumferential groove shape coaxial with the boss portion 11, and extends downward from the upper opening portion 6a. The upper opening portion 6a defines a ring shape surrounding the boss portion 11, and communicates with the bottom surface 10S of the mouth portion securing recess 10. The second lateral flow channel portion 6B communicates via an intersection portion P2 with the second vertical flow channel portion 6A. The second lateral flow channel portion 6B extends from the intersection portion P2 to a tip opening portion 6b at the tip of the outlet mouth portion 14.

The first closing plug 8A is to be elastically fitted to an upper end portion of the boss portion 11. In the present embodiment, as shown in FIG. 1, the first closing plug 8A defines a cap shape including a fitting cylindrical portion 20a to be fitted to an outer peripheral surface of the upper end portion of the boss portion 11, and a top plate portion 20b to close the upper end of the fitting cylindrical portion 20a. Accordingly, in the present embodiment, the outer peripheral surface of the upper end portion of the boss portion 11 defines the first closing plug securing portion 11A to be elastically fitted to the first closing plug 8A. The upper opening portion 5a of the first flow channel 5 communicates with the inside of the first closing plug securing portion 11A. The upper opening portion 6a of the second flow channel 6 communicates with the outside of the first closing plug securing portion 11A. Upon an increase in pressure of the first flow channel 5 with the compressed air from the compressor 3, the first closing plug 8A is to disengage from the first closing plug securing portion 11A to open the first flow channel 5.

The second closing plug 8B is subjectable to a manual movement so as to open the second flow channel 6 by the movement.

Figure 4A:
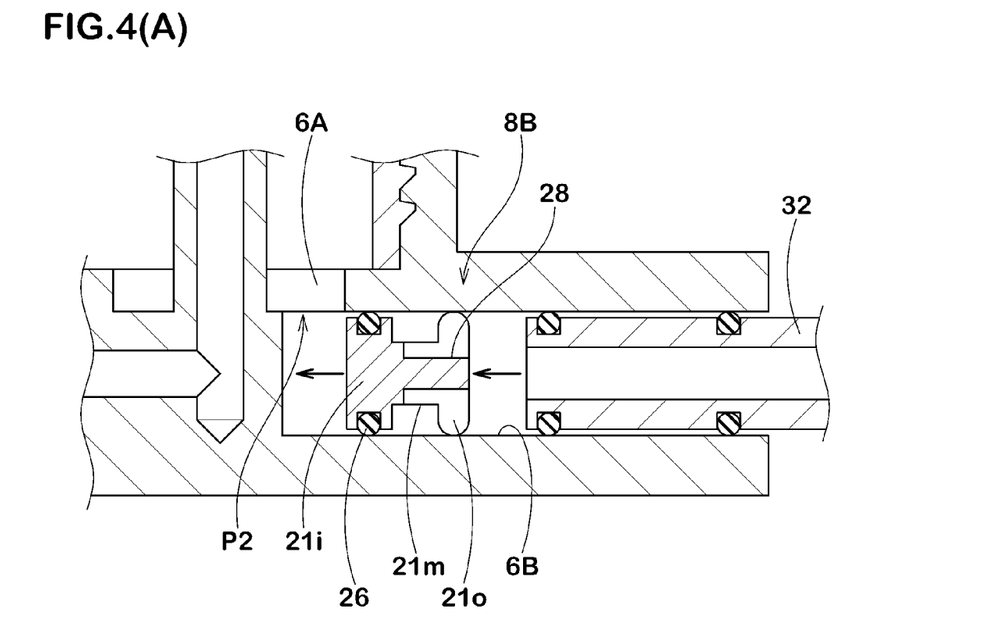
FIGS. 4(A) and 4(B) are cross-sectional views respectively illustrating opening/closing of a first flow channel by the second closing plug.
Figure 4B:
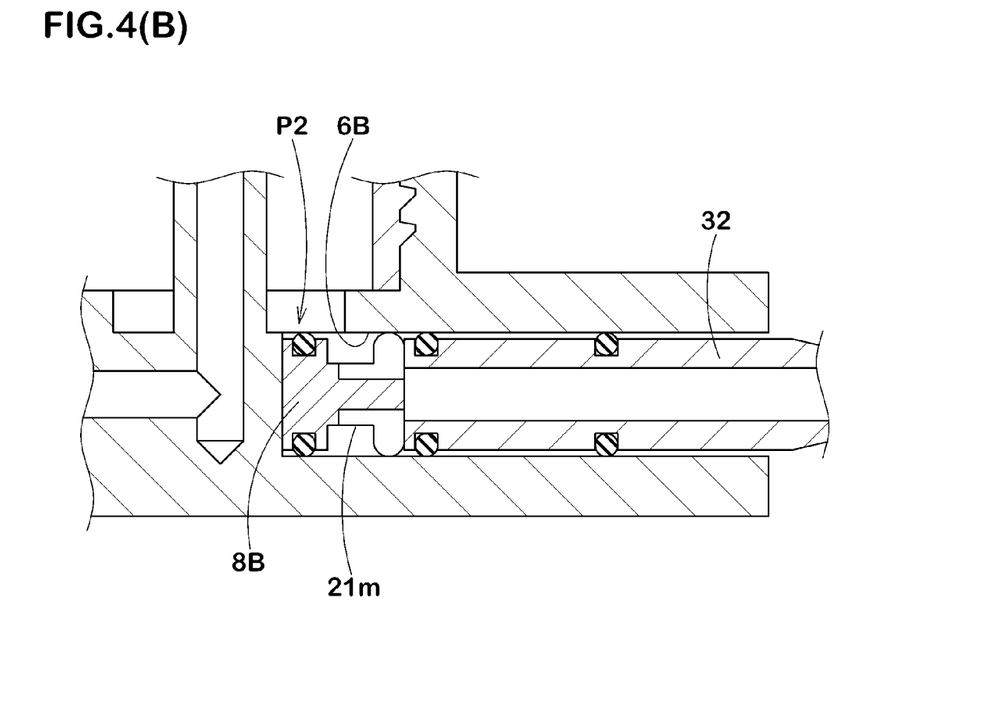

Specifically, the second closing plug 8B is interposed in the second lateral flow channel portion 6B so as to close the second lateral flow channel portion 6B as shown in FIG. 4(A). The second closing plug 8B is manually moved inward along the second lateral flow channel portion 6B so as to open the second lateral flow channel portion 6B as shown in FIG. 4(B).

Figure 3:
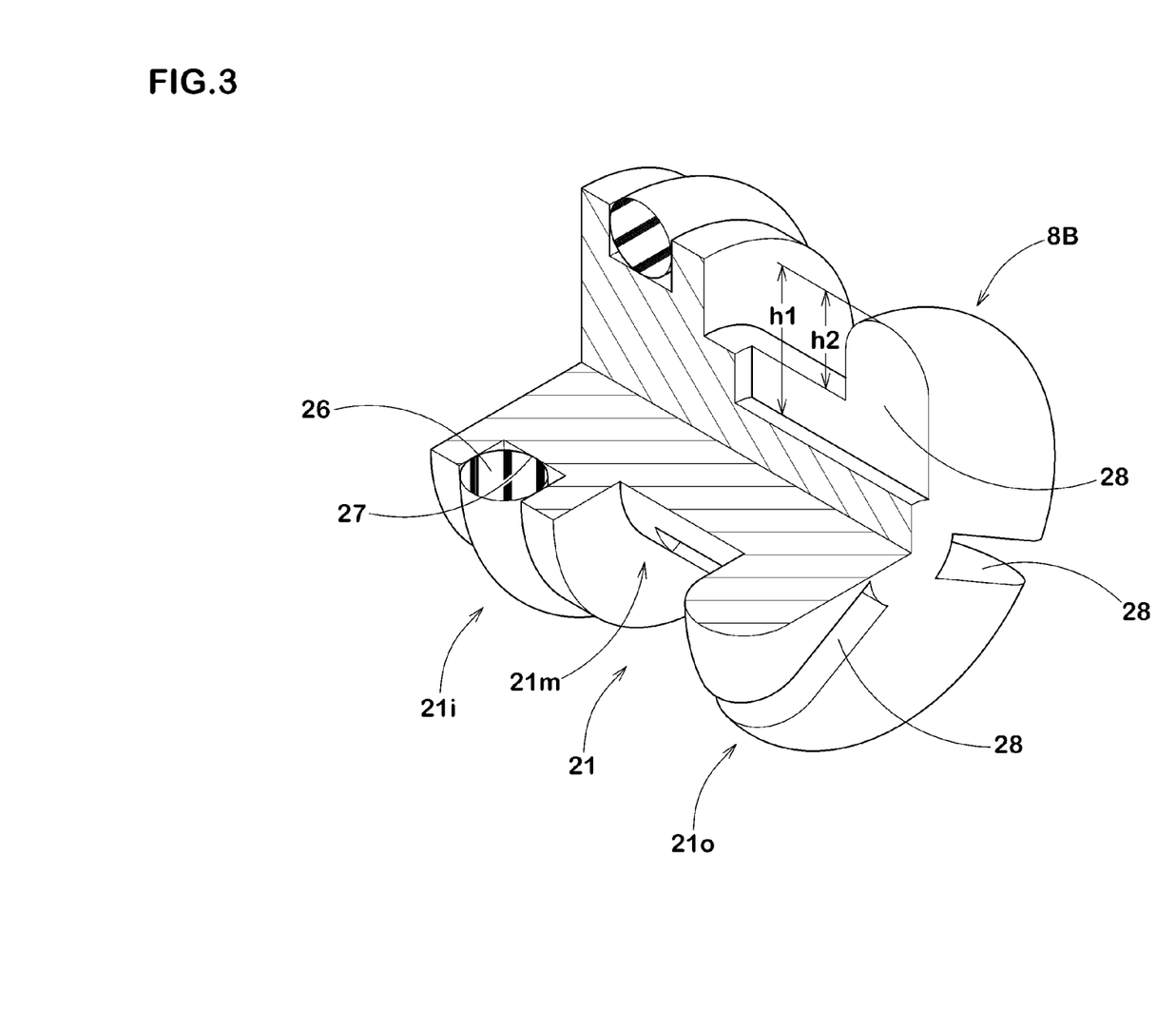
FIG. 3 is a perspective view illustrating a second closing plug.

As shown in FIG. 3, the second closing plug 8B includes a column-shaped base 21 to be slidably inserted into the second lateral flow channel portion 6B. A small-diameter constricted portion 21m is defined on a center side of the base 21. Accordingly, an inner head portion 21i and an outer head portion 21o are respectively defined inside and outside in the axial direction of the constricted portion 21m. A seal ring 26, such as an O-ring, is disposed along the outer periphery of the inner head portion 21i. The seal ring 26 ensures an air-tight contact between the inner head portion 21i and the inner peripheral surface of the second lateral flow channel portion 6B. Reference numeral 27 denotes a circumferential groove for securing the seal ring 26. A cross-section in the axial direction of the outer head portion 21o is defined into a circular arc shape. This contributes to decreasing the contact area between the outer head portion 21o and the inner peripheral surface of the second lateral flow channel portion 6B, thus ensuring a smooth slide.

At least one communication groove 28 (three in the present embodiment) is defined on the second closing plug 8. The communication grooves 28 extend through the outer head portion 21o to the inside and outside in the axial direction. The communication grooves 28 permit communication between the constricted portion 21m and the axially outside of the second closing plug 8B. In order to reduce flow resistance, a depth h1 from the outer periphery of the outer head portion 21o to the groove bottom of the communication groove 28 is preferably larger than a depth h2 of the constricted portion 21m. However, h1=h2 or h1<h2 is also allowable.

As shown in FIG. 4(A), the second lateral flow channel portion 6B is to be closed when the inner head portion 21i is located further outside in the axial direction than the intersection portion P2. As shown in FIG. 4(B), the second lateral flow channel portion 6B is to be opened when the second closing plug 8B is moved inward in the axial direction to make the constricted portion 21m overlap with the intersection portion P2.

In the present embodiment, the movement of the second closing plug 8B is attained by a push force applied when inserting the hose 33 into the hose coupling cylinder 32. As shown in FIG. 2, the hose coupling cylinder 32 includes, on an axially inner end side of the hose coupling cylinder 32, an insertion portion 32a to be slidably inserted into the second lateral flow channel portion 6B, and also includes, on an axially outer end side of the hose coupling cylinder 32, a hose coupling portion 32b to couple the hose 33. A seal ring 34, such as an O-ring, to be air-tightly contacted with the inner peripheral surface of the second lateral flow channel portion 6B is mounted on the insertion portion 32a.

Upon the push force applied when inserting the hose 33 into the hose coupling portion 32b, the second closing plug 8B is moved axially inward together with the hose coupling cylinder 32, so that the second lateral flow channel portion 6B is opened. As the hose coupling portions 30 and 32b, the present embodiment illustrates a telescopic one to permit direct insertion of the hose 33. Without limitation thereto, the hose coupling portions 30 and 32b may be respectively defined as one of joint portions constituting a so-called one touch joint.

Thus, in a storage state of the cap unit 1, the first and second flow channels 5 and 6 are respectively closed by the first and second closing plugs 8A and 8B, thereby preventing the puncture repair liquid T from flowing into the first and second flow channels 5 and 6. At the time of the puncture repair operation, the cap unit 1 is firstly piped. On this occasion, upon the operation of inserting the hose 33 into the hose coupling portion 32b, the second closing plug 8B is moved via the hose coupling cylinder 32 so as to open the second flow channel 6. Even after the second flow channel 6 is opened, the interior of the bottle container 4 is air-tightly held to prevent leakage of the puncture repair liquid T.

Subsequently, the compressor 3 is operated to perform the puncture repair. On this occasion, the compressed air from the compressor 3 increases the pressure of the first flow channel 5, so that the first closing plug 8A disengages to open the first flow channel 5. This allows the puncture repair liquid T in the bottle container 4 to be charged into the ti re (t).

Accordingly, with the cap unit 1 of the present embodiment, only the first closing plug 8A is to be disengaged with the compressed air without receiving the influence of the fitting by the second closing plug 8B. It is therefore ensured to relax the fitting precision of the first closing plug 8A. Additionally, the second flow channel 6 is to be manually opened in the second closing plug 8B, thereby eliminating the need for high fitting precision in the second closing plug 8A. Hence, it is ensured to prevent the trouble that the closing plug disengages to cause the liquid leakage during storage, and the trouble that the closing plug does not disengage at the time of use to make the puncture repair operation inoperable, while suppressing the drop in yield rate during production of the cap unit 1, and the increase in process costs for the product inspection process.

As shown in FIG. 1, the upper opening portion 5a of the first flow channel 5 is preferably located higher than the liquid surface TS of the puncture repair liquid T in the mount state Y. The reason for this is as follows. If the compressor 3 is operated with the second flow channel 6 side closed, the pressure in the bottle container 4 is abnormally enhanced. When the compressor 3 is subjected to pulsation on that occasion, there occurs a risk that the puncture repair liquid T in the bottle container 4 flows back toward the compressor 3. Hence, the above troubles are preventable by locating the upper opening portion 5a higher than the liquid surface TS. The state in which the second flow channel 6 side is closed can correspond to, for example, the case where the second flow channel 6 remains closed due to a defect of the second closing plug 8B, the case where the hose 33 to be coupled with the hose coupling portion 32b is bent and blocked, or the case where the tip of the hose 33 is blocked by the cap.

The upper opening portion 6a of the second flow channel 6 preferably communicates with the bottom surface 10S of the mouth portion securing recess 10, thereby ensuring to prevent the puncture repair liquid T from remaining in the bottle container 4 after the puncture repair.

Figure 5A:
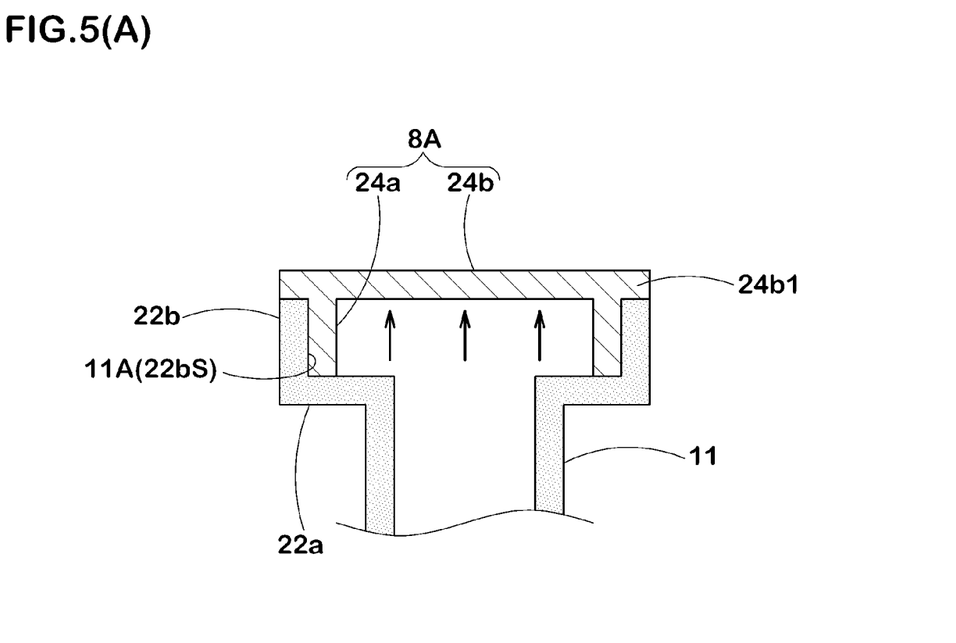
FIG. 5(A) is a cross-sectional view illustrating another example of a first closing plug.
Figure 5B:
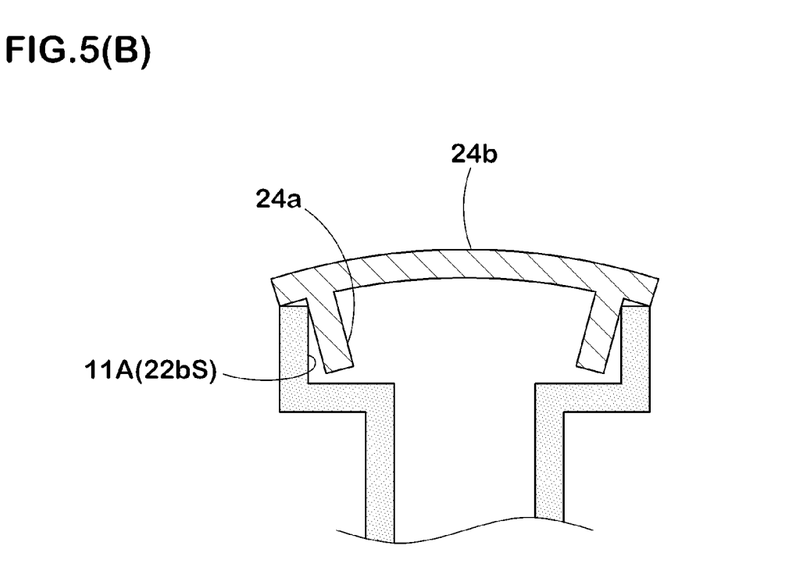
FIG. 5(B) is a cross-sectional view illustrating a disengagement situation of the first closing plug.

FIGS. 5(A) and 5(B) show another embodiment of the boss portion 11. With the present embodiment, the boss portion 11 is provided with a large-diameter portion 22b at an upper end portion thereof via a step portion 22a. A closing plug 8A of the present embodiment includes a fitting cylindrical portion 24a to be elastically fitted to an inner peripheral surface 22bs of the large-diameter portion 22b, and a top plate portion 24b to close the upper end of the fitting cylindrical portion 24a. That is, with the present embodiment, the inner peripheral surface 22bs of the large-diameter portion 22b defines the first closing plug securing portion 11A. The first closing plug 8A is fitted into an inner hole of the large-diameter portion 22b. A stopper portion 24b1 extending further radially outward than the outer peripheral surface of the fitting cylindrical portion 24a is defined on the top plate portion 24b. The stopper portion 24b1 is to be contacted with the upper end of the large-diameter portion 22b so as to perform positioning of the first closing plug 8A.

The large diameter portion 22b thus disposed allows the first closing plug 8A to have an increased area to receive the internal pressure of the first flow channel 5. This ensures that a large upward force is exerted on the first closing plug 8A. Further, as exaggeratedly shown in FIG. 5(B), by allowing the first closing plug 8A to be fitted into the inner hole of the large diameter portion 22b, the top plate portion 24b being subjected to the internal pressure is curvedly deformed into a convex shape, thereby weakening the fitting force between the fitting cylindrical portion 24a and the large diameter portion 22b. Consequently, the first closing plug 8A is removable with a smaller pressure while ensuring that the pressure contact force of the first closing plug 8A remains the same during storage.

The present embodiment illustrates the case where the cap unit 1 is to be coupled with the compressor 3 with the hose 31 interposed therebetween. However, the cap unit 1 and the compressor 3 may be directly coupled with each other without interposing the hose 31 therebetween. This contributes to enhanced standing stability to prevent falling of the bottle container 4 during the puncture repair operation.

While the particularly preferable embodiments of the present invention have been described in detail, the present invention is not limited to the illustrated embodiments, but can be modified and carried out in various aspects.

DESCRIPTION OF THE REFERENCE NUMERAL

1 Cap unit
3 Compressor
4 Bottle container
4A Mouth portion
5 First flow channel
5a upper opening portion
6 Second flow channel
6A Second vertical flow channel portion
6B Second lateral flow channel portion
6a Upper opening portion
6b Tip opening portion
7 Cap body
8 Closing means
8A First closing plug
8B second closing plug
10 Mouth portion securing recess
10S Bottom surface
11 Boss portion
11A First closing plug securing portion
13 Inlet mouth portion
14 Outlet mouth portion
32 Hose coupling cylinder
32b Hose coupling portion
33 Hose
T Puncture repair liquid
TS Liquid surface

The invention claimed is:

1. A cap unit for puncture repair, the cap unit comprising:
a cap body attached to a mouth portion of a bottle container storing a puncture repair liquid, and comprising an inlet mouth portion configured to feed compressed air from a compressor into the bottle container through a first flow channel, and an outlet mouth portion configured to sequentially take out the puncture repair liquid and the compressed air from the bottle container through a second flow channel by a feed of the compressed air, wherein the second flow channel comprises a second vertical flow channel portion extending downward from the upper opening portion, and a second lateral flow channel portion communicating via an intersection portion P2 with the second vertical flow channel portion, the second lateral flow channel portion extending from the intersection portion P2 to a tip opening portion of the outlet mouth portion; and
closing means for closing the first flow channel and the second flow channel, wherein the closing means comprises a first closing plug configured to close the first flow channel, and a second closing plug defined independently of the first closing plug and configured to close the second flow channel, wherein the second closing plug is configured to be interposed in the second lateral flow channel portion so as to close the second lateral flow channel portion, and the second closing plug is configured to be manually moved along the second lateral flow channel portion so as to open the second lateral flow channel portion, wherein the cap body comprises a mouth portion securing recess configured to allow the mouth portion of the bottle container to be inserted into and secured to the mouth portion securing recess, and a boss portion extending upward from a bottom surface of the mouth portion securing recess, and comprising a first closing plug securing portion permitting elastic fitting of the first closing plug to the first closing plug securing portion, wherein an upper opening portion of the first flow channel opens further inward than the first closing plug securing portion of the boss portion, and an upper opening portion of the second flow channel opens further outward than the first closing plug securing portion, wherein the first closing plug is configured to disengage from the first closing plug securing portion to open the first flow channel upon an increase in pressure of the first flow channel with the compressed air from the compressor, and the second closing plug is subjected to a manual movement so as to open the second flow channel by the movement, and wherein a hose coupling cylinder is disposed on the outlet mouth portion, an inner end side of the hose coupling cylinder being slidably inserted into the second lateral flow channel portion, the hose coupling cylinder comprising a hose coupling portion defined on an outer end side of the hose coupling cylinder, and wherein, upon a push force applied when inserting the hose into the hose coupling portion, the second closing plug is configured to move inward together with the hose coupling cylinder so as to open the second lateral flow channel portion.

2. The cap unit for puncture repair according to claim 1, wherein the upper opening portion of the first flow channel is located higher than a liquid surface of the puncture repair liquid stored in the bottle container in a mount state in which the bottle container is mounted on the cap unit.

3. The cap unit for puncture repair according to claim 1, wherein the upper opening portion of the second flow channel communicates with the bottom surface of the mouth portion securing recess.

\* \* \* \* \*